No. 785,075. PATENTED MAR. 21, 1905.
M. B. ANDERSON.
VEHICLE TOP.
APPLICATION FILED MAR. 10, 1904.
3 SHEETS—SHEET 1.
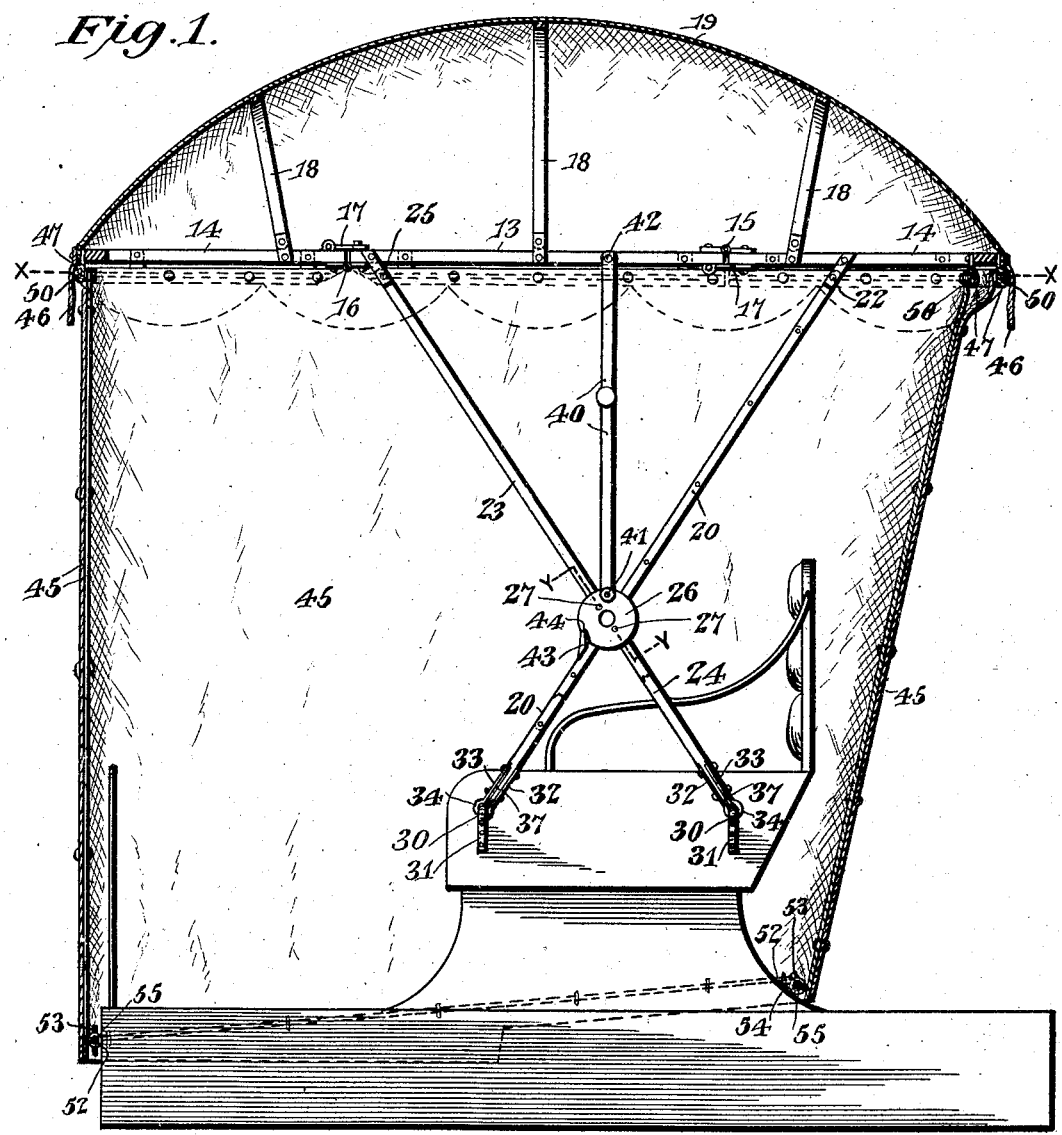
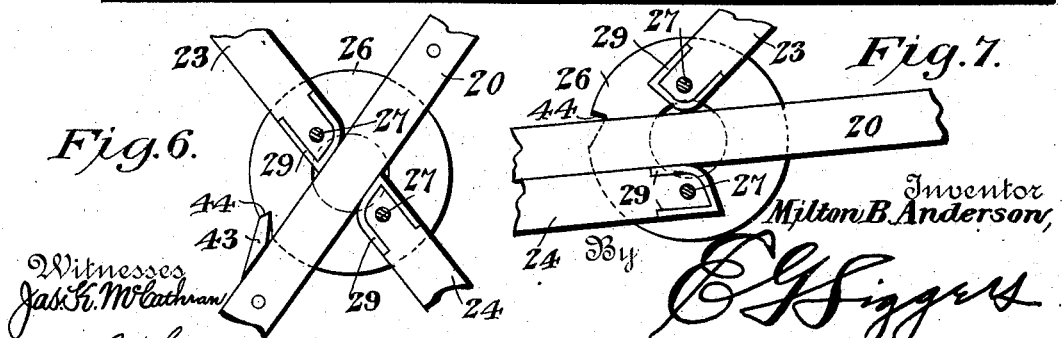

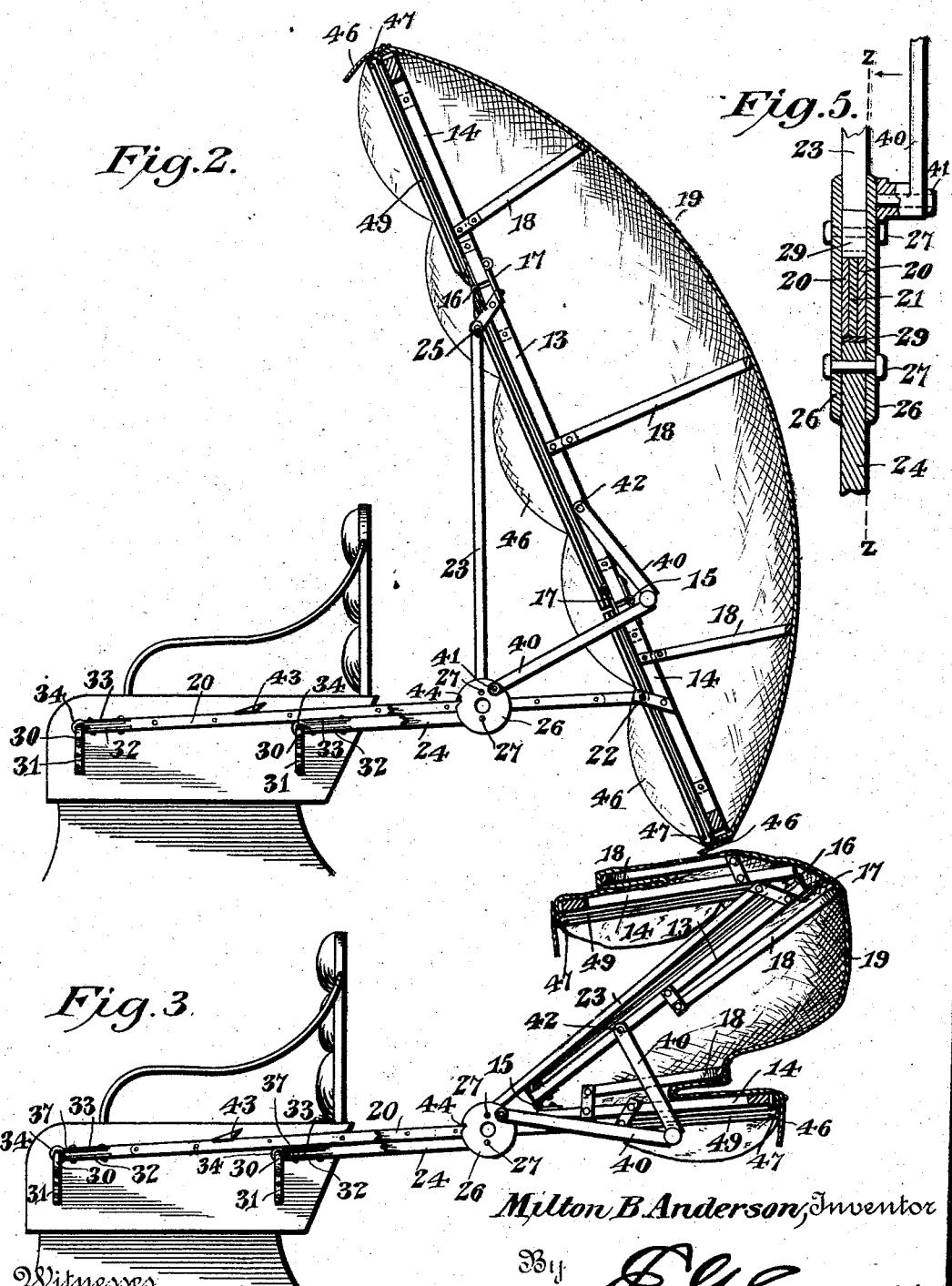

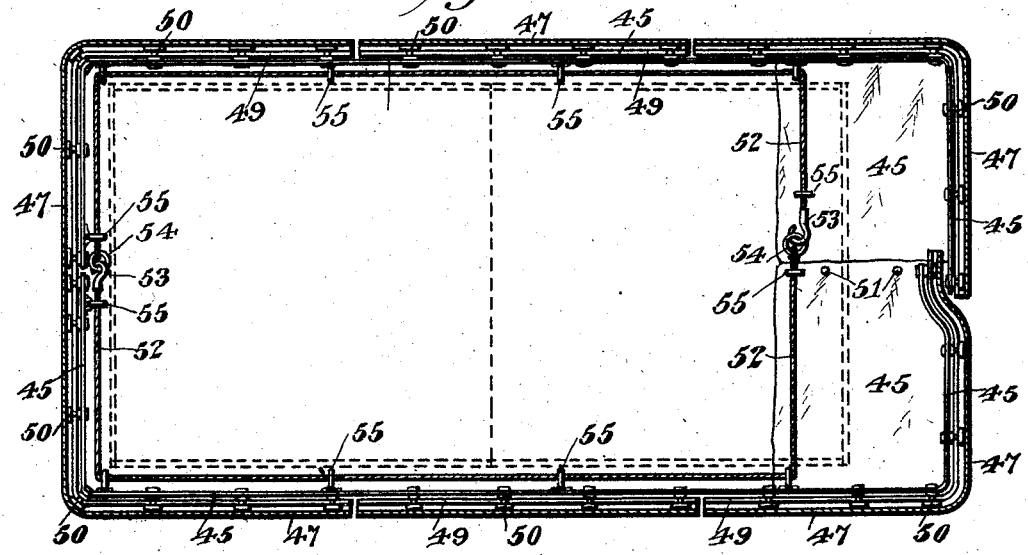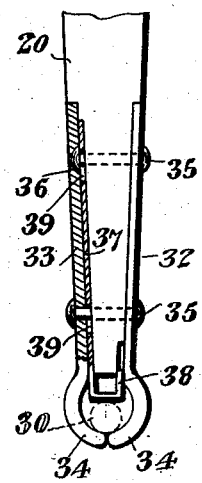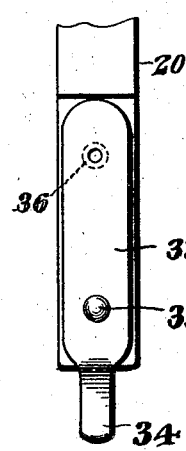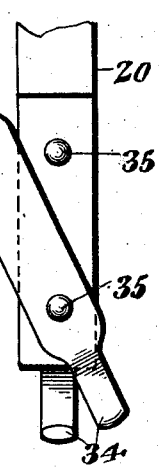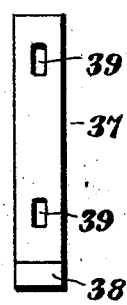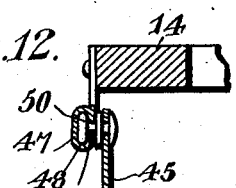

No. 785,075.  
Patented March 21, 1905.

UNITED STATES PATENT OFFICE.

MILTON B. ANDERSON, OF CHICAGO, ILLINOIS.

VEHICLE-TOP.

SPECIFICATION forming part of Letters Patent No. 785,075, dated March 21, 1905.

Application filed March 10, 1904. Serial No. 197,552.

*To all whom it may concern:*

Be it known that I, MILTON B. ANDERSON, a citizen of the United States, residing at Chicago, in the county of Cook and State of Illinois, have invented a new and useful Vehicle-Top, of which the following is a specification.

The present invention relates to folding vehicle-tops or calashes; and the object is to provide a novel structure of this character that will constitute an efficient covering for the occupants of the vehicle, will compactly fold, and when so folded will be entirely out of the way, and, furthermore, may be applied to and detached from a vehicle with ease, rapidity, and without the necessity of a wrench or other tool.

A further object is to provide novel means for supporting the side curtains of the top, which means permits the ready adjustment, removal, and replacement of said curtains.

The preferred form of construction is illustrated in the accompanying drawings, wherein—

Figure 1 is a sectional view through the improved vehicle-top, showing the same applied to a vehicle-body, elevated, and with the side curtains applied. Fig. 2 is a sectional view with the curtains removed and showing the canopy thrown back, but not collapsed. Fig. 3 is a view similar to Fig. 2, but showing said canopy partially collapsed. Fig. 4 is a sectional view taken on the line *x x* of Fig. 1. Fig. 5 is a detail sectional view taken substantially on the line *y y* of Fig. 1 and on an enlarged scale. Fig. 6 is a detail sectional view on the line *z z* of Fig. 5, showing the position of the standard members when the top is elevated. Fig. 7 is a similar view, but illustrating the standard member when collapsed. Fig. 8 is a detail view, partially in section, of the lower end of the standards. Fig. 9 is a side elevation thereof. Fig. 10. is a similar view, but showing the movable clip member swung to one position. Fig. 11 is a side elevation of the antirattler preferably employed, and Fig. 12 is a detail sectional view through the supporting means for the curtains.

Similar reference-numerals indicate corresponding parts in all the figures of the drawings.

The top member or canopy is constructed in the following manner: A substantially horizontal frame is employed, comprising intermediate side sections 13, to the ends of which are hinged end bow-sections 14, the hinges 15, connecting the rear end sections, being preferably located on the upper side of said sections, while the hinges 16, connecting the front bow-sections with the intermediate sections, are located on the under side of the same, whereby said end sections respectively fold above and below the intermediate sections. The various sections are, however, normally held in alinement by means of suitable hooks 17, located at the joints. Pivotally supported on this horizontal frame are a series of bows 18, extending from one side to the other, as will be readily understood, these bows being adapted to fold upon the horizontal frame when the sections thereof are collapsed, as illustrated particularly in Fig. 3. A flexible covering 19, of any desirable or any well-known material, has its edges secured to the horizontal frame and is properly supported by the bows 18 when said bows are elevated.

For the purpose of supporting the top sets of standards are employed at the opposite sides of the vehicle, each set comprising a pair of standards, which when elevated are arranged in the form of an X. One of these standards (designated 20) is continuous and is preferably reinforced by an intermediate strip of iron or other suitable metal 21. (Shown in Fig. 5.) The upper end of this standard 20 is hinged, as shown at 22, to the rear section 13 of the horizontal canopy-frame, while the lower end is pivoted to a suitable portion of the vehicle-body, preferably the front portion of the seat, in the manner hereinafter described. The other standard comprises sections 23 and 24, the section 23 being pivoted at its upper end, as shown at 25, to the front end of the corresponding intermediate section 13 of the horizontal canopy-frame. A runner is slidably mounted on the standard 20 and comprises side plates 26, preferably circular in form, which are located on opposite sides of said standard 20. The lower end of the standard-section 23 is pivoted to and between the plates 26, as shown at 27, and this pivot is so arranged that the adjacent end of the standard-section 23 will abut against the side edge of the standard 20 when the top is elevated. The pivoted ends of these sections are preferably shod with suitable sheet metal 29, which secures the material against splitting and wearing. The means for securing the lower ends of the standards to the vehicle-body will now be described. Interlocking eyes are employed for each standard. One of these eyes 30 is provided with a shank 31, suitably fastened to the side of the seat. The larger eye comprises clip members 32 and 33, the lower ends of which are substantially in the form of hooks 34, adapted to embrace the eye 30, as indicated in Fig. 8. The clip 32 is rigidly secured about one side of the lower end of the standard by suitable rivets 35, the lower of said rivets also passing through the opposite clips 33 and constituting a pivot upon which said clip can swing. The upper rivet 35 is not passed through the clip 33; but said clip is provided in its inner face with a socket 36, in which the head of the upper rivet is adapted to seat itself. An antirattler may be employed, if desired, said antirattler consisting of a metal plate 37, secured to the lower end of the standard by the rivets 35 and having an offset lower end 38, adapted to bear upon the eye 30, secured to the vehicle-body. This antirattler may be adjustable, and for this purpose the bolts or rivets 35 pass through slots 39, formed in the plate. It will be understood that this eye is thus capable of being opened, and one is attached to the lower end of each standard. Consequently said standards can be removed from the vehicle-body by opening the eyes and detaching the same from the eyes 30, secured to the said body.

For the purpose of securing the top in elevated position jointed-holding-braces are employed comprising pivotally-associated sections 40, said braces being each pivoted at its lower end, as shown at 41, to the runner between the sections. The upper section of the brace is pivoted at 42 to the central section of the canopy-frame between the pivotal connections 22 and 25 of the upper ends of the standards. The downward movement of the runner upon the standard 20 is also limited by means of a dog 43 projecting from one side of the standard 20 and arranged to engage in a notch 44, formed in the runner.

Side curtains 45 are employed in connection with the canopy or top, these side curtains being supported in the following advantageous and novel manner: A valance 46 surrounds the canopy-frame 13, and secured to this frame within the valance is a substantially continuous guideway 47. (Illustrated more particularly in Fig. 4 and shown in detail in Fig. 12.) The guideway consists of a sheet or plate secured to the horizontal frame and looped to provide an inclosed passage 48, having a continuous longitudinal slot 49. The upper ends of the curtains 45 are provided with outstanding buttons that pass through the slot 49 and have heads 50 slidably mounted in the guide or passage way. The ends of the guideway are preferably located in rear of the top and are open, so as to permit the introduction and detachment of the button-heads. The said ends are preferably overlapped, as illustrated in Fig. 4, so that the adjacent ends of the curtains are likewise overlapped, fasteners 51 being employed for securing the overlapped ends together. The front ends of the curtains may in like manner be detachably secured together, if desired. In order to prevent the lower ends of the curtains from flapping, fastening means are employed in the form of cables 52, each cable having a hook 53 at one end and a ring or eye 54 at the other, adapted to receive the hook of the adjacent cable. These cables, as will be apparent, can be readily secured about the front of the dash and in rear of the seat, and suitable rings 55, carried by the lower portion of the curtain, are slidably mounted upon said cables.

It is believed that the operation of the structure will be readily understood by referring to the three figures of the drawings. When the brace 40 is broken, the standards are unfastened and the top can be swung rearwardly to the position illustrated in Fig. 2, the runner 26 sliding upon the standard 20 and the sections 23 and 24 of the front standard turning upon their pivots 27 and 28. It is desired to call attention to the position of the parts when they are thrown back and as illustrated in Fig. 2. There is no obstruction of any kind at the side of the seat, and the entire mechanism for supporting the canopy in its inclined or substantially upright position is located in the rear of said seat, and consequently there is nothing in the way of a person entering or alighting from the vehicle. Practically the same is true of the structure when elevated, for the reason, as illustrated in Fig. 1, that the supporting-standards are located in rear of the front edge of the seat, and therefore, if the curtains are thrown back, a freely-open space is left between said front of the seat and the dash. The canopy can also be collapsed and is shown partially so in Fig. 3. It will be clear that said canopy can be folded very compactly to be entirely out of the way. Moreover, the entire top may be removed from the vehicle and hung in a barn or other repository in its folded condition, where it will occupy a minimum amount of space. At the same time it can be easily placed in position upon the buggy without the use of wrenches or other tools, as it is only necessary to open the eyes of the standards, engage the same upon the eyes of the seat, and reclose said standard-eyes.

Another very important feature is the curtain-suspending means. It will be clearly apparent that the curtain may be attached to or detached from the canopy with great ease, as it only requires the passage of the buttons into or out of the open ends of the guideway. The curtains, moreover, can be easily slid to position about the sides and front of the vehicle and as easily thrown back should it become desirable or necessary. Thus, for instance, in case of a runaway the curtains, if on the canopy, can be quickly passed back in rear of the top-supporting standards, thus leaving an open and unobstructed space through which a person may jump.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a vehicle-top, the combination with a body, of a standard mounted thereon, a top pivotally connected to the standard, a runner slidably mounted on the standard, and another standard comprising sections, one of said sections being pivotally connected to the top and runner, the other section being a single rigid piece pivotally connected at its ends to the runner and body.

2. In a vehicle-top, the combination with the top, of a standard pivoted to the rear portion of the top, a runner slidably mounted on the standard, and another standard comprising sections one of which is pivoted to the runner and to the front portion of the top, the other section being pivoted to the runner and extending below the same, said sections being disposed in alinement when the top is elevated.

3. In a vehicle-top, the combination with the vehicle-top, of standards supporting the same and disposed in substantially the form of an X when elevated, one of the standards being continuous and pivoted to the top contiguous to one end, a runner slidably mounted upon said continuous standard, the other standard comprising sections pivoted to the runner on opposite sides of the continuous standard, the upper of said standards being pivoted to the top, and means for pivotally securing the lower end of the continuous standard and the lower end of the lower section to a vehicle-body.

4. In a vehicle-top, the combination with a canopy, of standards for supporting the same, one of said standards having a pivotal connection with the canopy, a runner slidably mounted on said standard and comprising plates that embrace the same, the other standard comprising sections pivoted between the plates, one of said sections having a connection with the canopy.

5. In a vehicle-top, the combination with a canopy, of a standard, means for pivotally connecting the upper end of the standard to the canopy, means for pivotally securing the lower end of the standard to a vehicle-body, a runner slidably mounted on said standard and comprising spaced plates that embrace the same, and another standard comprising sections, said sections having ends that are pivoted between the plates of the runner on opposite sides of the main standard, means for pivotally connecting one of the standards to a canopy, and means for pivotally attaching the other section to a vehicle-body.

6. In a vehicle-top, the combination with a canopy, of a standard pivotally connected thereto, a runner slidably mounted on the standard, a standard-section pivotally connected to the runner and canopy, and a jointed brace connected to the runner and canopy.

7. In a vehicle-top, the combination with a canopy, of a standard pivotally connected thereto, a runner slidably mounted on the standard, a standard-section pivotally connected to the runner and canopy, and a jointed brace connected to the runner and canopy between the standard and section.

8. In a vehicle-top, the combination with a canopy, of a standard pivotally connected thereto at its upper end, a runner slidably mounted on the standard, upper and lower standard-sections pivotally connected to the runner, the upper standard-section having a pivotal connection with the canopy at its upper end and being disposed in angular relation to the standard when elevated, and a jointed brace pivoted at its lower end to the runner and having its upper end pivoted to the canopy substantially midway between the standard and the standard-section.

9. In a vehicle-top, the combination with a substantially horizontal frame comprising hinged sections, of means for securing the hinged sections in alinement, bows pivoted to the opposite portions of the frame and extending above the same, intersecting standards pivotally connected to the horizontal frame, one of said standards comprising pivotally-associated sections, and means for securing the standards to a vehicle-body.

10. In a vehicle-top, the combination with a canopy, of a standard for supporting the same, said standard having a dog, a runner slidably mounted on the standard and arranged to engage the dog, and a brace connecting the runner and canopy and constructed to hold the runner in engagement with said dog.

11. In a vehicle-top, the combination with a canopy-supporting standard, of detachably-interlocked eyes, one of which is secured to the standard, and means for fastening the other eye to a vehicle-body.

12. In a vehicle-top, the combination with a canopy-supporting standard, of detachably-interlocked eyes, one of said eyes comprising pivotally-associated clips arranged to embrace the other eye, means for attaching one eye to the body of the vehicle, and means for securing the other to the standard.

13. In a vehicle-top, the combination with a canopy-supporting standard, of detachably-interlocked eyes, means for securing one of the eyes to a vehicle-body, the other eye comprising pivotally-associated clips, means for rigidly securing one of the clips to the standard and pivotally securing the other clip to said standard, and a device for normally holding the pivoted clip against movement.

14. In a vehicle-top, the combination with a canopy, of inclosed guideways supported along the sides thereof, and side curtains having headed portions slidably mounted in the guideways and supported thereby.

15. In a vehicle-top, the combination with a canopy, of guideways supported along the sides thereof, and flexible side curtains having projecting devices at their upper ends, said devices being slidably mounted in the guideways and constituting means for supporting the curtains.

16. In a vehicle-top, the combination with a canopy, of inclosed guideways secured to the opposite sides of the same and having longitudinally-disposed slots, and flexible side curtains having projecting buttons at their upper ends, said buttons extending through the slots and engaging in the guideways.

17. In a vehicle-top, the combination with a substantially horizontal canopy-frame, of inclosed guideways secured to the opposite sides of the frame and in the front thereof, and curtains having projections at their upper ends that are slidably mounted in the guideways, said curtains being movable along the sides and in the front of the canopy.

18. In a vehicle-top, the combination with a canopy, of a continuous guideway extending along the front, sides, and rear of the canopy, said guideway having its ends overlapping in the rear of the canopy, and curtains having projecting portions slidably mounted in the guideways and constituting supports for said curtains.

19. In a vehicle-top, the combination with a canopy, of curtains slidably suspended from the canopy and movable about the front, sides, and rear of the same, a cable arranged to be secured to the seat and dash of a vehicle, and eyes carried by the lower portions of the curtains and sliding upon the cable.

In testimony that I claim the foregoing as my own I have hereto affixed my signature in the presence of two witnesses.

MILTON B. ANDERSON.

Witnesses:
RICHARD PAUL,
M. HAGERTY.